May 3, 1932.  A. W. McLINTOCK ET AL  1,856,650
EDUCATIONAL DEVICE
Filed July 5, 1929   2 Sheets-Sheet 2
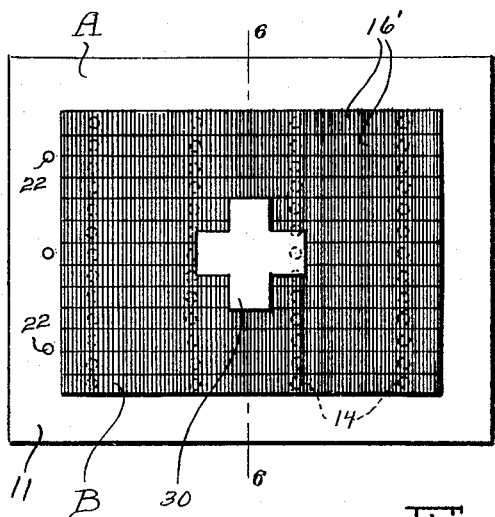
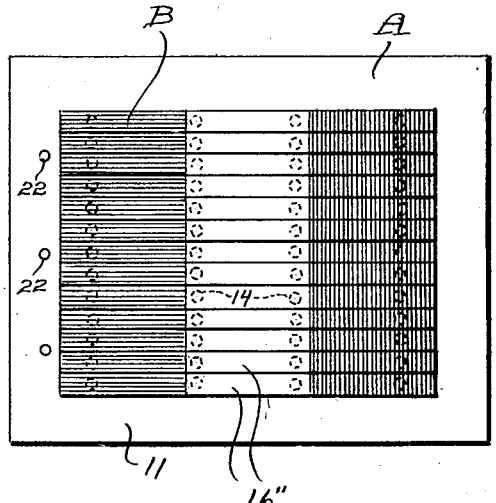
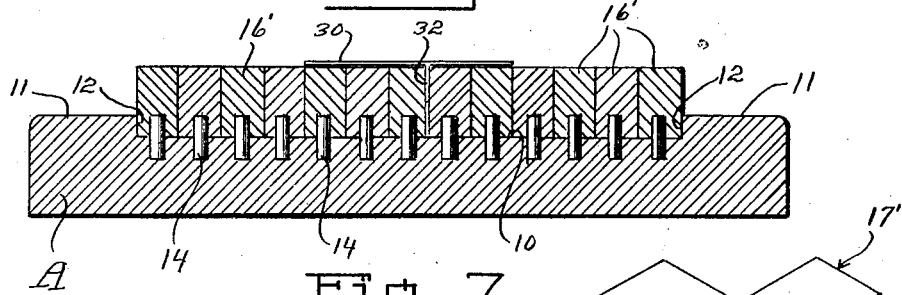
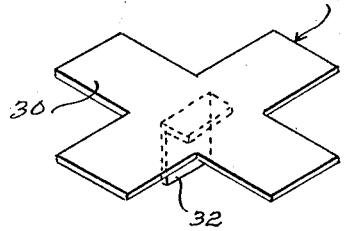
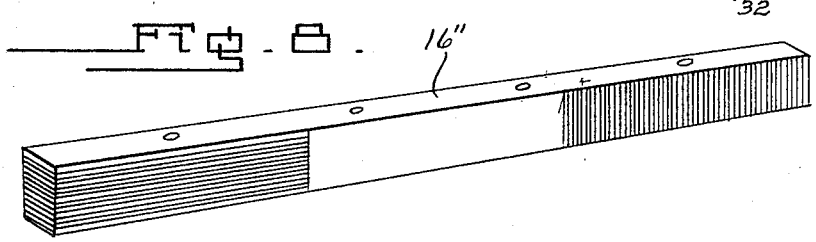
INVENTORS
Addison W. McLintock
John W. Rice
ATTORNEYS.

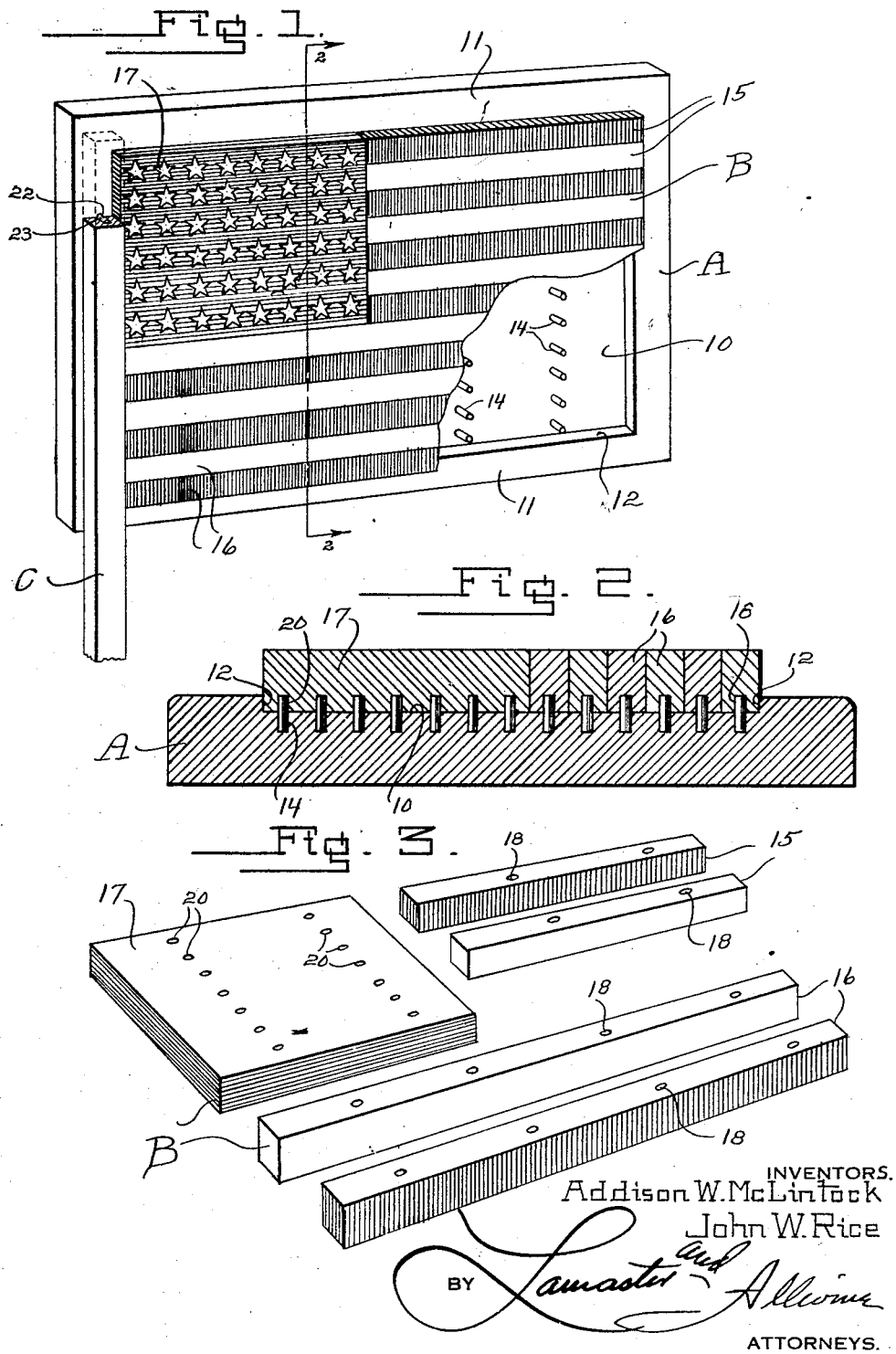

Patented May 3, 1932

1,856,650

UNITED STATES PATENT OFFICE

ADDISON W. McLINTOCK AND JOHN W. RICE, OF CHAMPAIGN, ILLINOIS

EDUCATIONAL DEVICE

Application filed July 5, 1929. Serial No. 376,147.

The present invention relates to an educational device and the primary object of the invention is to provide a device for the assembly of certain portions thereof in the construction of flags which in its use will be highly instructive as well as afford considerable amusement to children in assembling flags or ensigns of the nations of the world.

A further object of the invention is to provide a device of this kind for educational purposes embodying a mounting board upon which the flag pieces may be assembled in various positions to form flags of different nations.

A further object of the invention resides in the novel construction of the mounting board and the manner in which the interchangeable flag pieces having various configurations are removably held in assembled relation upon the mounting board.

A still further object of the invention is to provide a device of this character which will permit of the assembled flags being disposed in various positions without likelihood of the assembled flag forming members falling from the mounting board.

Other objects and advantages of the invention will be apparent during the course of the following detailed description, taken in connection with the accompanying drawings, forming a part of this specification, and in which drawings, Figure 1 is a perspective view of the device showing the representation of the United States flag and showing fragmentary portions broken away for illustrating details of construction.

Figure 2 is an enlarged section on line 2—2 of Figure 1.

Figure 3 is a perspective view of the rear sides of some of the flag pieces as would be required for constructing the United States flag.

Figure 4 is a plan view showing the flag of Switzerland assembled in the holder.

Figure 5 is a plan view showing the flag of France assembled in the holder.

Figure 6 is an enlarged transverse section on line 6—6 of Figure 4.

Figure 7 is a perspective view of a canton in the form of a white cross for use in forming the flag of Switzerland.

Figure 8 is a perspective view looking at the rear side of a tri-colored strip for the formation of tri-colored flags such as shown in Figure 5.

Referring to the drawings in detail, and wherein similar reference characters designate corresponding parts throughout the several views, the flag assembling device has been shown including a mounting board or holder A for independently and removably receiving the flag forming pieces B, and C a staff for removable connection with the holder A.

The mounting board or holder A is of substantially flat rectangular shaped formation and may be formed from wood or any other suitable material relatively light in weight. The front or upper face of the mounting board is provided inwardly of its marginal edges with a shallow rectangular shaped recess or pocket 10 forming a bordering flange 11 extended about the marginal edges of the mounting board. This shallow recess or pocket 10 is formed with straight side and end walls 12 as shown in Figures 2 and 6.

Arranged in the recess 10 is a series of rows of preferably cylindrical mounting pegs 14 and which rows of pegs extend transversely of the recess. The rows of pegs are preferably four in number with the end rows spaced slightly from the end walls 12 of the recess 10, and with the rows of pegs mounted an equal distance apart as shown by dotted lines in Figures 4 and 5. The end rows of pegs are spaced equal distances from the end walls of the recess, and the pegs of each row are spaced at equal distances apart, as clearly shown in Figures 2 and 6. As will be observed in Figures 2 and 6 the upper ends of the pegs preferably extend flush with the top surface of the bordering flange 11.

Referring more specifically now to Figures 1, 2 and 3, and wherein are shown flag forming pieces for constructing a representation of the United States flag, the pieces herein shown consist of a series of short and long strips 15 and 16 respectively, and a canton block 17. The strips 15 and 16 and which are preferably formed of wood, bear different colors, certain of the strips being white and the others red. These strips 15 and 16 when alternately arranged provide the red and white stripes for formation of the United States flag. The strips are colored on their sides, top and ends, and it is immaterial whether the bottom sides of the strips be colored or not. The stripe forming strips are of such thickness that when thirteen of the strips are arranged in side by side relation they will snugly fit in the height of the recess 10. The longer strips 16 are of a length equal to the length of the recess, while the shorter strips 15 are of such length that when disposed in abutting relation at one end with the canton block 17 the said block will extend for the length of the recess. The strips 15 and 16 are of a height greater than the depth of the recess 10 and are provided in their underside with equally spaced apart circular sockets 18 of a diameter to snugly receive the mounting pegs 14. It may here be well to state the mounting pegs 14 are spaced on centers a distance equal to the thickness of the strips 15 and 16 so that when the strips are arranged in side by side relation in the recess 10 on the pegs 14 no space will be left between adjacent strips. When the stripe forming strips are in engagement with the base of the recess 10, the strips project well above the bordering flange 11 which permits ready and easy placing and removal of the strips in the recess on the mounting pegs.

The canton 17 for forming the blue field of the flag is colored blue at its ends, sides and top surface and the blue top surface is provided with the forty-eight white stars. The canton block is of a thickness equal to the height of the strips 15 and 16 so that when placed in the recess 10 the upper surface of the block will extend flush with the upper edges of the stripe forming strips. The under-side of the canton block 17 is provided with preferably two rows of sockets 20, and which rows are spaced equal to the spacing of the rows of mounting pegs 14, and with the sockets 20 of each row spaced equally on centers similar to those of the mounting pegs. This will allow for the block to be mounted on a series of the pegs in the upper left hand corner of the recess 10. Thus it will be seen that when the pieces consisting of the strips 15 and 16 and the block 17 are assembled on the pegs 14 in the recess 10 that the representation of the American flag will be had, bordered by the flange 11.

The staff C is also removable and mounting of the staff upon the holder A may be accomplished by the provision of a suitable number of pegs 22 projecting upwardly from the flange 11 at one end of the recess 10 for fitting in suitable recesses 23 provided in the under side of the preferably wooden staff C. The pegs 22 aside from forming a mounting for the staff C also serve to designate the staff end of the flags when being assembled in the recess 10. This staff is preferably of rectangular shape in cross section and of such thickness as to project slightly above the upper surface of the flag assembled in the recess of the holder.

With reference particularly now to Figures 4, 6 and 7 and wherein an assembly representing the flag of Switerzerland is shown, the strips 16' are of identical construction as that of the strips 16 with the exception that the strips 16' are colored red at their sides, ends and top surface so that when a series of 13 of the strips are arranged in the recess 10 a solid red field will be formed equal in area to the area of the recess. Since the flag of Switzerland has a red background with a white cross in the center of the red background, a novel construction for the canton 17' is provided which permits the canton being disposed in the center of the red background formed by the strips 16'. The canton 17' is preferably formed from sheet metal and includes a white cross 30 to the underside of which is secured as by soldering or the like, a thin metal fin 32 which may be inserted between adjacent strips 16' as shown in Figure 6. This insertion of the fin 32 between adjacent strips disposes the white cross in substantially surface contact with the red field formed by the strips 16' and a slight binding action of the strips upon the fin will hold the canton in place. In the formation of different flags having the canton disposed at different locations the canton may be of the proper design and inserted in the proper position upon the field formed by the proper strips required for formation of the flag.

In Figures 5 and 8 and wherein the flag forming pieces are placed to provide the French flag, the strips 16'' are tri-colored, having a white central portion with one end colored blue and the other end colored red. Thirteen of the strips 16'' when properly placed in the recess 10 will form, blue, white, and red stripes representing the French flag, the blue stripe being disposed at the staff end of the flag adjacent the staff mounting pegs 22. Thus it will be seen that flags of different nations may be formed by sets of properly colored strips together with a proper design of a canton. As an illustration, thirteen red strips and a canton as at 17' may form a set of pieces for formation of the flag of Switzerland, while seven short strips, as at 15 and six long strips, as at 16, together with the canton block 17, may form a set of pieces of formation of the American flag.

In the formation of flags such as shown in Figures 4 and 5, the strips for placing in the recess 10 are each of a length equal to the length of the recess, and if shorter strips are required for formation of any particular flag, such as the strips 15 shown in Figure 3 the shorter strips are provided with at least two sockets for positioning over the pegs 14.

From the foregoing it will be apparent that an improved educational device for the assembly of certain portions thereof in the construction of flags has been disclosed which will afford much amusement as well as being instructive in the formation of flags of different nations. It will also be apparent that a novel arrangement has been disclosed wherein the flag representations will have a neat appearance when assembled and that the flag-forming pieces are so removably associated with the holder as to remain in position during handling of the assembled apparatus. It will also be apparent that by having the flag-forming pieces project above the bordering flange 11, that the child may easily and readily grasp the ends of the pieces for proper removal and placement of the same in the recess 10.

Changes in detail may be made to the form of invention herein shown and described, without departing from the spirit of the invention or the scope of the following claims.

We claim:

1. An educational device comprising a substantially flat mounting board having a shallow rectangular recess provided in its face side providing a marginal flange about the recess, a set of flag-forming pieces adapted to be assembled in abutting relation upon the bottom surface of the recess and having a height greater than the depth of the recess, a staff member and means for releasably retaining the staff member in overlying relation upon the marginal flange at one end of the recess and in engagement with the said pieces.

2. An educational device comprising a substantially flat rectangular holder having a shallow rectangular recess provided in its face side forming a bordering flange about the recess, a set of flag-forming pieces adapted to be assembled in the recess, pegs projecting from the marginal flange along one side of the recess forming the staff end of the flag, and a staff member having recesses provided in one end thereof for positioning over the pegs provided in the bordering flange.

3. An educational device comprising a holder having a recess provided in its face side, rows of equi-distantly spaced apart mounting pegs extended transversely of the recess and projecting upwardly thereinto, and flag-forming pieces for assembling in the recess including a canton block having sockets in its underside for receiving a selected group of the mounting pegs, stripe-forming strips having sockets in their undersides for positioning over a selected group of the pegs at one end of the canton block, and longer stripe-forming strips having sockets in their lower sides for positioning over a selected group of the pegs adjacent the canton block and said first mentioned strips.

4. An educational device comprising a holder having a recess provided in its face side, and flag-forming pieces adapted to be assembled in abutting relation in the recess, including a canton having means for maintaining itself in superposition over said other game pieces assembled to form a flag.

ADDISON W. McLINTOCK.
JOHN W. RICE.